United States Patent

Wolff

[11] 3,914,871
[45] Oct. 28, 1975

[54] DOWELING BORING GAUGE FOR TWO WORKPIECES TO BE DOWELLED TOGETHER ON THEIR FRONT FLAT SIDES

[76] Inventor: Robert Wolff, Bundesrepublik, 5446 Engeln, Germany

[22] Filed: Oct. 11, 1974

[21] Appl. No.: 514,228

[30] Foreign Application Priority Data
Aug. 6, 1974 Germany .......................... 2437724

[52] U.S. Cl. ............ 33/174 G; 33/180 R; 33/185 R; 269/41; 408/115
[51] Int. Cl.² ... B23Q 3/06; B25B 1/20; B23B 49/02
[58] Field of Search .......... 33/174 G, 185 R, 180 R; 269/2, 41, 87.3; 408/103, 108, 115

[56] References Cited
UNITED STATES PATENTS

| | | | |
|---|---|---|---|
| 705,930 | 7/1902 | Jaegar | 269/41 |
| 859,800 | 7/1907 | Britton | 269/2 |
| 1,237,143 | 8/1917 | Allen | 33/174 G |
| 2,801,655 | 8/1957 | Zern | 269/41 |
| 2,930,263 | 3/1960 | Jones | 408/115 |
| 3,109,466 | 11/1963 | Jones | 408/103 |

Primary Examiner—Richard E. Aegerter
Assistant Examiner—Richard R. Stearns
Attorney, Agent, or Firm—Abraham A. Saffitz

[57] ABSTRACT

Doweling boring gauge for two workpieces which are to be dowelled together on their front flat sides one with the other, characterized by a double screw clamp with two clamps oriented perpendicularly in relation to one another, the receiving spaces for the workpieces being located one on top of the other at a distance defining a gap between the clamp down workpieces and also characterized by a drilling pattern which can be clamped down on a workbench with at least one pair of correlated bore holes and a guide bridge shiftable in the gap and oriented in a backwards direction.

6 Claims, 8 Drawing Figures

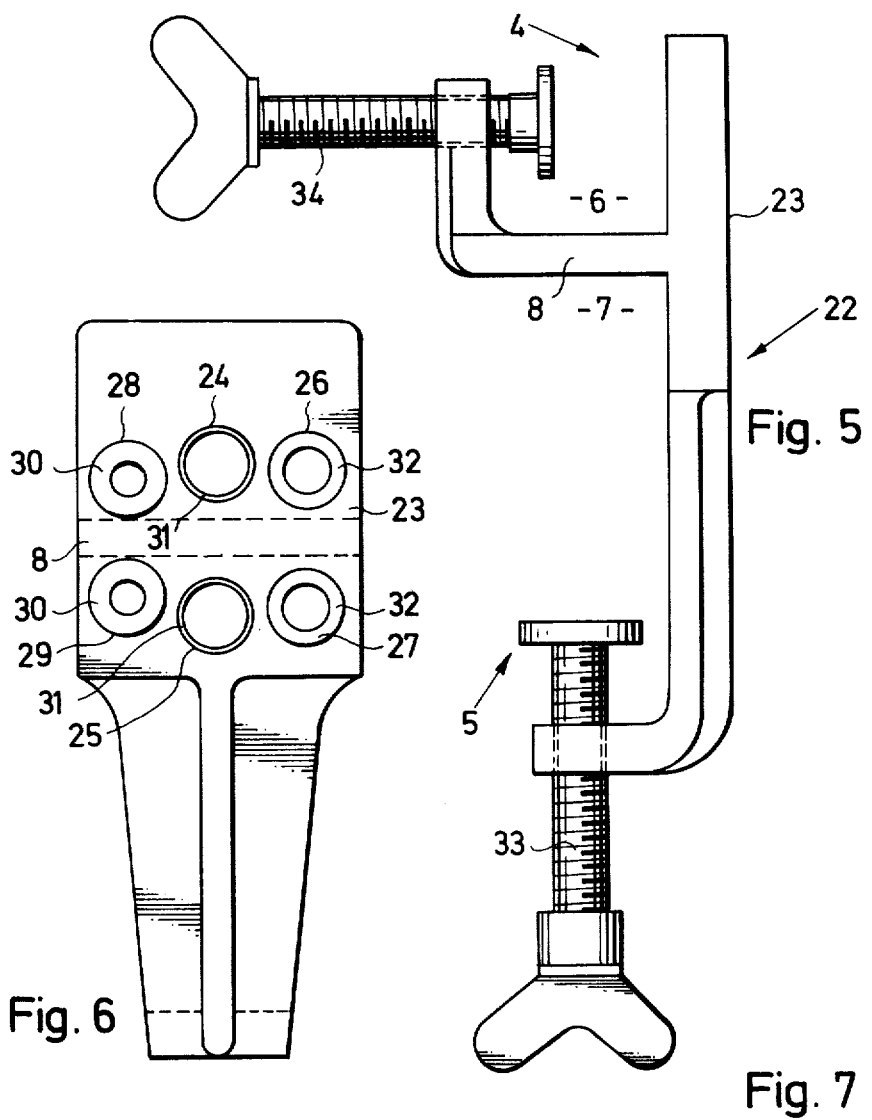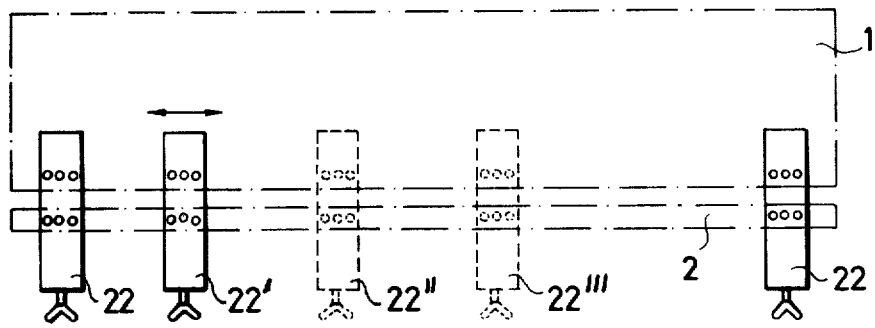

३,९१४,८७१

DOWELING BORING GAUGE FOR TWO WORKPIECES TO BE DOWELLED TOGETHER ON THEIR FRONT FLAT SIDES

CROSS-REFERENCE TO RELATED APPLICATION

Cross-reference is made to German Patent Application No. P 24 37 724.0 of Aug. 6, 1974 which is mentioned in the Declaration and to which applicant claims the priority under 35 USC 119.

BACKGROUND OF THE INVENTION

1. Field of the Invention

The invention lies in the field of gauging devices for workworking.

2. Description of the Prior Art

In the manufacture of furniture, for example of shelves or wardrobes, often times dowels are used for connecting the horizontal bottoms with the vertical walls of the furniture, for which purpose groups of holes for dowels being exactly aligned with one another must always be bored (drilled) in the front sides of the horizontal drawer (shelf) bottoms and in the flat sides of the vertical walls of the furniture. The congruent arrangement of the groups of holes in the two workpieces which are to be connected however represents an exceedingly difficult time consuming work for hobby craftsmen (do-it-yourself craftsmen), which requires particularly very precise measurements.

SUMMARY OF THE INVENTION

The invention is based on the task of creating a reasonably priced boring gauge for dowels, suitable particularly for do-it-yourself craftsmen, which tool is simple in its application (manipulation) and which will ensure a forced congruence between the groups of dowel holes belonging together.

For the solution of this task and according to the invention, a boring gauge for doweling is provided for two workpieces that are to be dowelled together on their front flat sides, which is characterized by a double screw clamp with two clamps oriented perpendicularly in relation to one another, the receiving spaces for workpieces of which lie superposed upon one another at a distance defining a gap between the clamped down workpieces and by a boring template for at least one pair of bore holes belonging together, which can be clamped down on a workbench or on one of the workpieces, which template for boring has a guide bridge, shiftable in the gap between the clamped down workpieces and oriented backwardly between its bore holes.

The doweling boring gauge according to the invention consists basically of two cooperating parts which always have different functions. The one part, that is to say the double screw clamp, has the task of clamping down the two workpieces in such a way at the proper angle on a workbench etc., that the surfaces of the workpieces to be provided with bore holes confront each other toward the same side, whereby the double screw clamp furthermore must ensure that the two workpieces will be clamped down while forming a gap from one another at a defined distance. The other part, that is to say the boring template, is then inserted with its guide bridge into the gap between the two clamped down workpieces, whereby its pattern plate, provided with a pair of bore holes, lies on the surfaces of the two clamped down workpieces which are to be provided with bores. The boring template is shifted longitudinally along the gap and along the workpieces and is stopped in various positions in which then always the pairs of bore holes belonging together are drilled in the two workpieces. The clamping down of the two workpieces by the double screw clamp is maintained until all holes of the two groups of holes belonging together have been drilled. Precisely by maintaining the clamping down of the workpieces, the forcible congruence between the two groups of holes belonging together of the two workpieces will be ensured.

Corresponding to their various tasks, the two parts of the doweling boring gauge can be constructed individually. Preferably and according to the invention however provision has been made to develop the two parts of the dowling boring gauge identically, therefore to make both in the form of double screw clamps with a front pattern plate having at least one pair of bore holes, so that therefore one double screw clamp serves for the clamping down of the two workpieces and an identical other double screw clamp can be used as a pattern (template) for the bore holes. Preferably also several of these pattern double screw clamps can be used, for example three of them, by clamping down the two workpieces at their ends with two pattern double screw clamps and by drilling the holes at the ends using these two parts, while a third pattern double screw clamp is arranged between the two outside bore holes and shifted into the pertinent boring positions and clamped down there in order thus to drill the middle holes of the group of holes.

OBJECTS OF THE INVENTION

Further characteristics and advantages of the object of the invention are given in the subclaims and in the succeeding description of the figures.

The object of the invention is described in more detail in the succeeding paragraphs on the basis of two embodiments shown in the drawing.

BRIEF DESCRIPTION OF THE DRAWING

FIG. 5 shows an arrangement developed at the same time as a double screw clamp and a drilling pattern, two of which or a multiple of which constitute a second embodiment of the doweling boring gauge according to the invention;

FIG. 6 shows the basic body of the screw clamp in FIG. 5 viewed from the right; and FIG. 7 is a schematic presentation for the explanation of the method of application of the embodiment according to the FIGS. 5 and 6;

DESCRIPTION OF THE PREFERRED EMBODIMENT(S)

Figure 1:
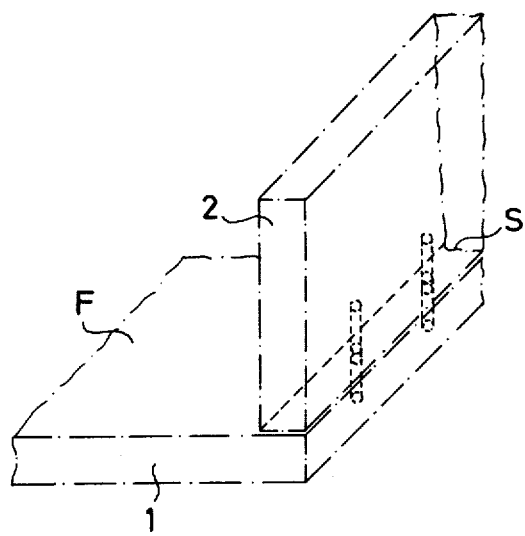
FIG. 1 shows two workpieces that are to be dowelled together on their front flat sides, in the case of which we are dealing with boards made of wood.

FIG. 1 shows two workpieces 1, 2 which are joined together in an angle joint with the use of dowels. For this purpose, the workpiece 1 on its flat side F and the workpiece 2 at its front side S are to be provided with congruent dowel holes.

Figure 2:
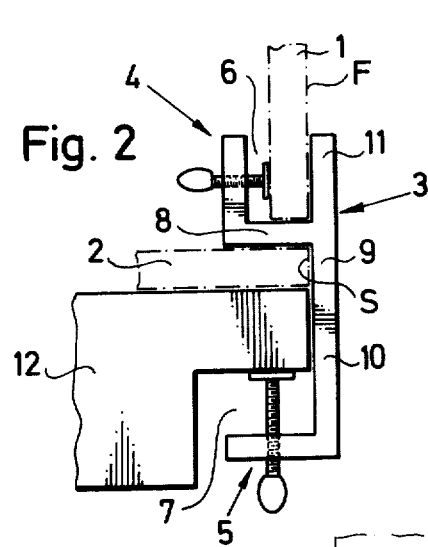
FIG. 2 shows a first embodiment of a double screw clamp.
Figure 8:
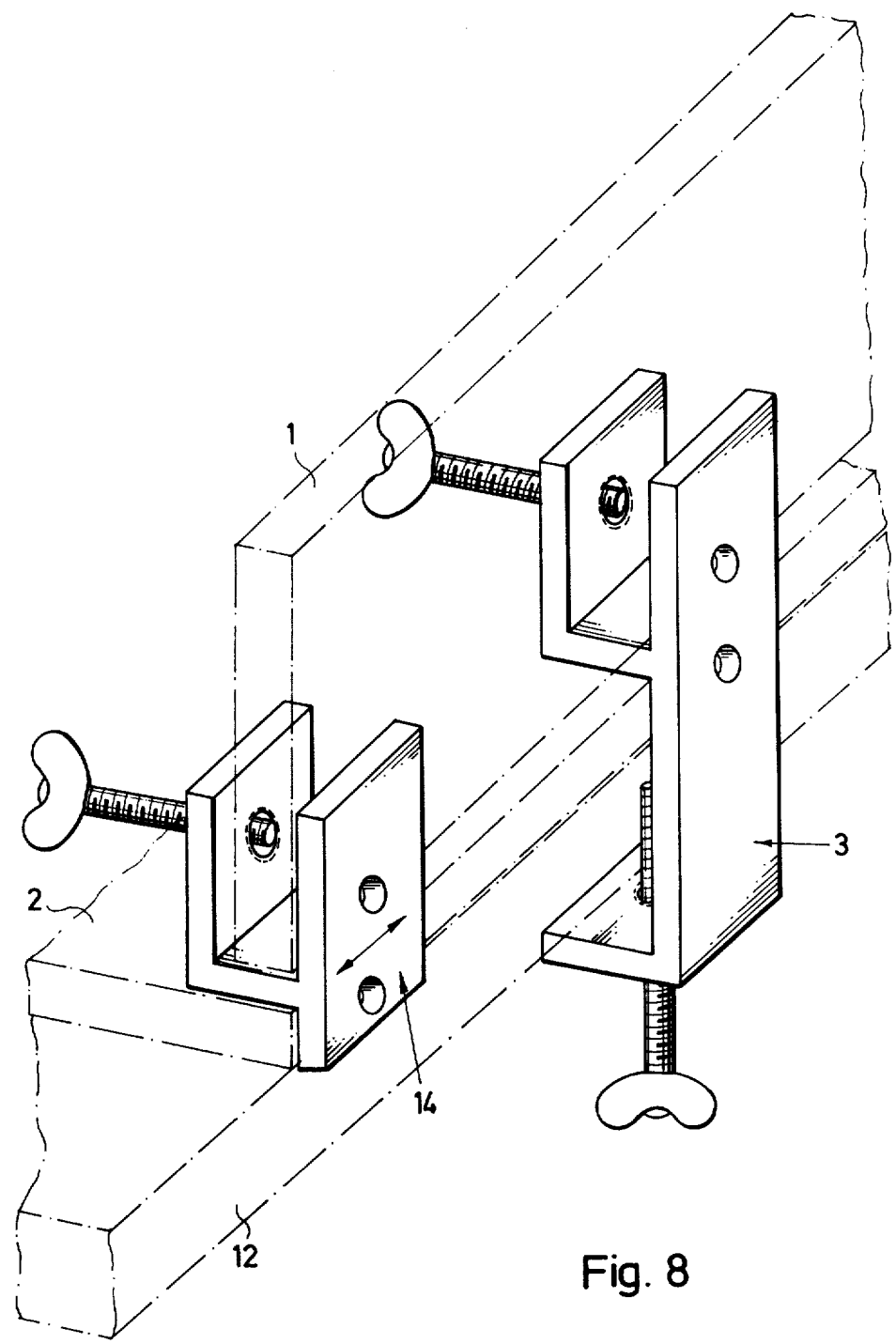
FIG. 8 is a perspective presentation of the double screw clamp and of the drilling pattern according to the FIGS. 2 and 3.

FIG. 2 — compare also FIG. 8 — shows a double screw clamp 3 with two U-shaped clamps 4, 5 oriented perpendicularly in relation to one another, the receiving spaces 6, 7 for the workpiece of which are oriented perpendicularly in relation to one another and have a distance in height one from the other, fixed by a spacer 8. The double screw clamp 3 has a front plate 9, the lower part 10 of which constitutes the leg of the bottom of the U-shaped clamp 5 and the upper part 11 of which represents the lateral fitting leg of the second U-shaped clamp 4. The spacer 8 constitutes the bottom leg of the second clamp 4 and at the same time the lateral fitting leg of the clamp 5.

Figure 4:
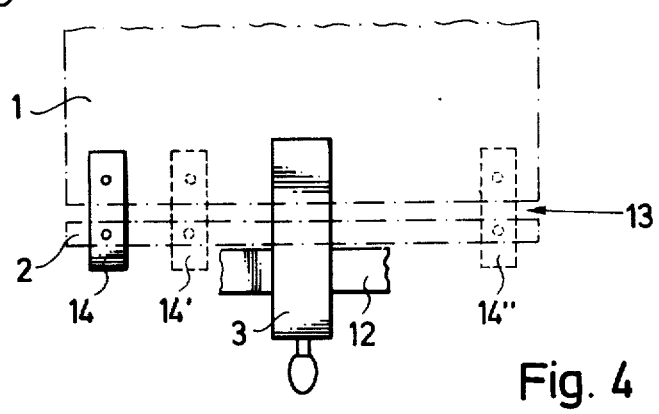
FIG. 4 is a schematic presentation for the explanation of the method of application of the doweling boring gauge according to the FIGS. 2 and 3.

The clamp 5 serves for clamping down the workpiece 2 which is to be drilled on the front side, to a workbench 12, whereby its front side S fits against the front plate 9. The workpiece 1, which is to be drilled on its flat side, is clamped down by means of clamp 4, whereby its flat side F that is to be drilled likewise fits against the front plate 9. The two workpieces 1 and 2 are clamped down at a distance in height from one another fixed by the spacer 8, so that laterally a free gap 13 (cf. FIG. 4) is created beside the double screw clamp 3 between the two fixed workpieces 1 and 2.

Figure 3:
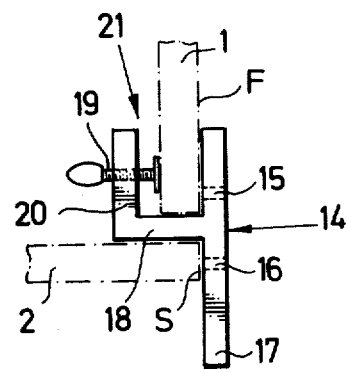
FIG. 3 is a drilling pattern pertaining to the double screw clamp shown in FIG. 2.

FIG. 3 shows a drilling pattern 14, which has a pattern plate 17, provided with a pair of bore holes 15, 16 and a guide bridge 18 projecting backward between the bore holes 15, 16, the thickness of said guide bridge being preferably equal to the thickness of the spacer 8. The upper part of the pattern plate 17, together with the guide bridge 18 and with a rear bend (corner, knee) 20 of the guide bridge, carrying a clamp screw 19, constitutes a U-shaped screw clamp 21.

The drilling pattern 14 is inserted with its guide bridge 18 into the gap 13 (cf. FIG. 4) between the two clamped down workpieces 1 and 2, whereby the pattern plate 17 fits against the sides F, S of the two workpieces that are to be drilled. After tightening of the clamp screw 19, a pair of holes are drilled into the workpieces receiving the guide holes 15, 16, after which the clamp screw 19 is loosened and the drilling pattern is shifted or replaced along the gap 13 into new drilling positions 14' or 14''. Since during the entire drilling operations the clamping of the two workpieces 1 and 2 is maintained by the double screw clamp 3, the groups of bore holes drilled into the workpieces 1 and 2 are necessarily aligned precisely with one another.

FIGS. 5 and 6 show a double screw clamp developed at the same time as a drilling pattern, which in two or in several pieces constitute a doweling boring gauge according to the invention. The double screw clamp here too again has U-shaped clamps 4, 5 oriented again perpendicularly to one another, the receiving spaces 6, 7 of which are separated again by a distancing piece 8, one from the other. Differing from the embodiment according to FIG. 2 given by way of example, in this case the front plate 23 is provided on both sides of the spacer 8 with correlated drilled guide holes 24/25, 26/27 and 28/29 into which drill sockets 30, 31, 32 with a variable inside diameter, are inserted. The drill sockets 30 serve for example for 6 mm (= 0.236220 inches) dowels for boards of 12 to 14 mm (= 0.47244 to 0.55118 inch) thickness. The drill socket 32 for 8 mm (= 0.314961 inch) wooden dowels for boards of a width of 15 to 17 mm (= 0.59055 to 0.66929 inch) and the drill socket 31 for 10 mm (= 0.39370 inch) wooden dowels for boards of a thickness of 18 to 23 mm (= 0.70866 to 0.90551 inch).

FIG. 7 illustrates the use of the pattern double screw clamp according to the FIGS. 5 and 6. The two workpieces 1 and 2 are clamped down firmly at their longitudinal ends on a workbench etc., by means of two such double screw clamps 22. By making use of the guide holes provided in their front plates 23, the workpieces can be provided at their ends already with the dowel holes. A third double screw clamp 22' is disposed between the two outside double screw clamps 22, which third double screw clamp is guided with its spacer 8 which corresponds to the guide bridge 18 according to FIG. 3, in the longitudinal gap between the two workpieces and which, after loosening its two clamp screws 33, 34, can be shifted into any arbitrary intermediate positions 22'', 22''' and can be stopped there for the pertinent drilling process.

What is claimed is:

1. Doweling boring gauge for two workpieces which are to be dowelled together, the front side of one workpiece to be dowelled to the flat side of a second workpiece to form a right angle joint, comprising:

a double screw clamp provided with two clamps which are oriented perpendicularly in relation to one another;

one of the two clamps being adapted to clamp the front side of one of the workpieces with a flat side to a workbench and the other clamp being adapted to position the other workpiece perpendicularly to the said one of the workpieces;

receiving spaces for said two workpieces in said double screw clamp being located one on top of the other and being at a distance defining a predetermined gap between the clamped down workpieces;

a drilling pattern including means for clamping said pattern on one of said workpieces and having a pattern plate comprising an upper and a lower part and extending over both workpieces when both workpieces are clamped in said double screw clamp; and, said pattern plate being provided with at least one pair of correlated bore holes and has between its bore holes a guide bridge which is shiftable in said gap and extends therein.

2. Doweling boring gauge as claimed in claim 1 wherein the two clamps of said double screw clamp are U-shaped clamps integrally connected one with another and these clamps comprise a front plate having:

a lower part, which constitutes the bottom leg of that one of the U-shaped clamps which is destined for reception of the workpiece which is to be drilled on its front side;

an upper part which constitutes the lateral fitting leg of the other U-shaped clamp for the reception of the workpiece which is to be drilled on its flat side; and, a leg oriented backwardly and defining the gap between the two receiving spaces of said double screw clamp.

3. Doweling boring gauge as claimed in claim 2 wherein said front plate is comprised of at least one correlated pair of bore holes serving as a template.

4. Doweling boring gauge as claimed in claim 1 wherein said guide bridge is provided with a rear bend directed parallel to the upper part of the pattern plate of the drilling pattern and carrying a clamp screw wherein said upper part of guide bridge, rear bend and clamp screw constitute a screw clamp for the reception of the pattern plate on the workpiece which is to be drilled on its flat side.

5. Doweling boring gauge as claimed in claim 1 wherein the lower part of the pattern plate of the drilling pattern together with a lower bend thereof carrying a clamp screw and together with the guide bridge constitutes a screw clamp for clamping down the workpiece which is to be drilled on its front side.

6. Doweling boring gauge as claimed in claim 1 wherein the pattern plate has several pairs of bore holes provided with drill sockets of different diameters.

* * * * *